United States Patent
Medvinsky et al.

(10) Patent No.: US 9,177,114 B2
(45) Date of Patent: Nov. 3, 2015

(54) METHOD AND APPARATUS FOR DETERMINING THE PROXIMITY OF A CLIENT DEVICE

(75) Inventors: Alexander Medvinsky, San Diego, CA (US); Petr Peterka, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 2297 days.

(21) Appl. No.: 11/455,510

(22) Filed: Jun. 19, 2006

(65) Prior Publication Data

US 2007/0294645 A1 Dec. 20, 2007

Related U.S. Application Data

(60) Provisional application No. 60/723,487, filed on Oct. 4, 2005.

(51) Int. Cl.
*G06F 3/048* (2013.01)
*G06F 3/00* (2006.01)
*G06F 21/10* (2013.01)

(52) U.S. Cl.
CPC ........ *G06F 21/10* (2013.01); *G06F 2221/0708* (2013.01)

(58) Field of Classification Search
None
See application file for complete search history.

(56) References Cited

U.S. PATENT DOCUMENTS

| | | | |
|---|---|---|---|
| 5,699,431 A | 12/1997 | Van Oorschot et al. | |
| 6,466,162 B2 * | 10/2002 | Boman | 342/357.34 |
| 6,525,690 B2 * | 2/2003 | Rudow et al. | 342/357.4 |
| 7,225,164 B1 | 5/2007 | Candelore et al. | |
| 7,328,243 B2 * | 2/2008 | Yeager et al. | 709/205 |
| 7,389,273 B2 * | 6/2008 | Irwin et al. | 705/59 |
| 7,436,958 B2 | 10/2008 | Ji et al. | |
| 7,574,747 B2 * | 8/2009 | Oliveira et al. | 726/29 |
| 2003/0084311 A1 | 5/2003 | Merrien et al. | |
| 2003/0105739 A1 | 6/2003 | Essafi et al. | |
| 2003/0149668 A1 | 8/2003 | Lee et al. | |
| 2003/0188117 A1 | 10/2003 | Yoshino et al. | |
| 2004/0078598 A1 * | 4/2004 | Barber et al. | 713/201 |
| 2005/0071280 A1 * | 3/2005 | Irwin et al. | 705/59 |
| 2005/0220304 A1 | 10/2005 | Lenoir et al. | |
| 2005/0257046 A1 | 11/2005 | Durand | |
| 2005/0262022 A1 * | 11/2005 | Oliveira et al. | 705/51 |
| 2006/0053494 A1 | 3/2006 | Kamperman et al. | |
| 2006/0177066 A1 * | 8/2006 | Han et al. | 380/277 |

* cited by examiner

*Primary Examiner* — Marcus T Riley

(74) *Attorney, Agent, or Firm* — Fox Rothschild LLP

(57) ABSTRACT

The present invention discloses an apparatus and method for a method for determining proximity of a device (e.g., a client device). In one example, a key management request is acquired from the device. A measurement request is then transmitted to the device. Afterwards, a measurement reply is received from the device. In response, a determination is made as to whether a measurement parameter associated with the transmitting and the receiving exceeds a predetermined threshold. If the predetermined threshold is not exceeded (i.e., the device is proximate to an associated local network), then a reply to the original key management request is transmitted to the device. Notably, the reply to the key management request is required for the device to establish a secure session with a server from which digital content can be acquired.

20 Claims, 2 Drawing Sheets

METHOD AND APPARATUS FOR DETERMINING THE PROXIMITY OF A CLIENT DEVICE

This application claims the benefit of U.S. Provisional Application No. 60/723,487 filed on Oct. 4, 2005, which is herein incorporated by reference.

BACKGROUND OF THE INVENTION

1. Field of the Invention

Embodiments of the present invention generally relate to video-over-networks, e.g., video-over-Internet Protocol (IP) networks that utilize digital rights management functions for securely communicating content between network components. More specifically, the present invention relates to a method and apparatus for determining the proximity of a client device in relation to its local network.

2. Description of the Related Art

Digital content has recently gained wide acceptance in the public. Such content includes, but is not limited to: movies, videos, music, and the like. Consequently, many consumers and businesses employ various digital media devices or systems that enable the reception of such digital multimedia contents via several different communication channels (e.g., a wireless satellite link or a wired cable connection). Similarly, the communication channel may be a telephony based connection, such as DSL and the like.

Existing content protection systems (e.g., DTCP/IP) associated with the exchange of digital media can typically determine a client device's general location upon the device's registration with a content server in a local network. The general locality of a registering device may be checked by measuring the round-trip time (RTT) associated with the transmitted registration communication. Typically, a client device is required to register on a predetermined periodic basis, e.g., every 48 hours. However, this approach fails to prevent the remote access of restricted or prohibited content in designated "blacked out" areas. For example, a user may register a client device in one area (e.g., customer's home network) and forward the content to the second location (e.g., customer's summer home) that has been designated as a "blacked out" area. A user can therefore effectively bypass the viewing restrictions imposed in a given area. Alternatively, the client device may be physically moved from its local network after the most recent registration. As a result, a user is afforded a considerable amount of time to register a device at one area (e.g., local network), subsequently move the registered device to a second location, and ultimately view content that may be restricted within the second location.

Thus, there is a need in the art for a method and apparatus for determining the proximity of a client device to a local network.

SUMMARY OF THE INVENTION

The present invention discloses an apparatus and method for a method for determining proximity of a device (e.g., a client device). In one example, a key management request is acquired from the device. A measurement request is then transmitted to the device. Afterwards, a measurement reply is received from the device. In response, a determination is made as to whether a measurement parameter associated with the transmitting and the receiving exceeds a predetermined threshold. If the predetermined threshold is not exceeded (i.e., the device is proximate to an associated local network), then a reply to the original key management request is transmitted to the device. Notably, the reply to the key management request is required for the device to establish a secure session with a server from which digital content can be acquired.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
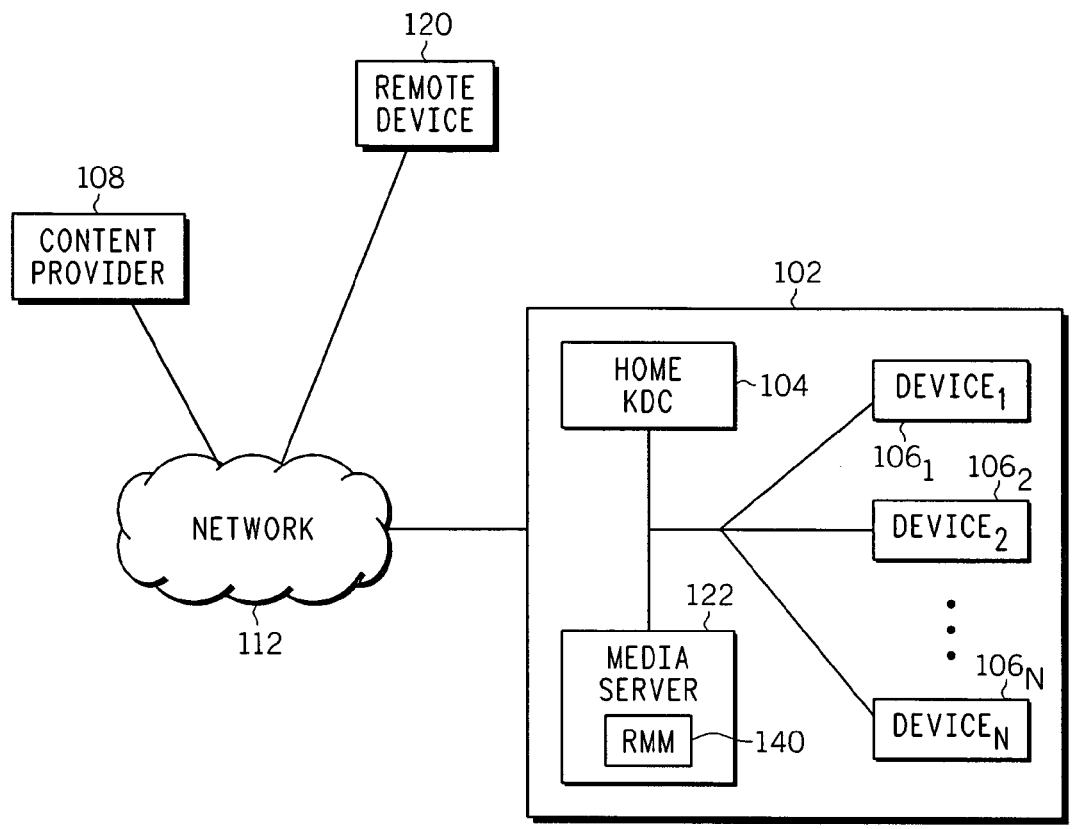
FIG. 1 depicts a block diagram of a system for facilitating the streaming of digital content over a communications network in accordance with the present invention.

FIG. 1 is a block diagram of a content distribution system 100 (e.g., an Internet Protocol rights management (IPRM) system) that utilizes an authenticated key management protocol (e.g., MOTOROLA ESBroker™ protocol) to facilitate the secure transfer of digital rights and content. The key management protocol may be any type of protocol that provides key management and security in accordance with an exemplary embodiment of the present invention.

In one embodiment, the system 100 comprises a remote content provider 108 (e.g., a streaming server), a communications network 112 (e.g., the Internet), a remote device 120, and a local network 102. Although only one content provider 108, one remote device 120, and one local network 102 are depicted, those skilled in the art realize that any number of content providers, remote devices, or local networks may be included in the system 100.

The local network 102 may comprise a home network that includes a Home key distribution center (Home KDC) 104 and a plurality of client devices $106_1 \ldots _N$. The devices $106_1 \ldots _N$ may each comprise a set top box (STB), a digital video recorder (DVR), and the like. These devices may be used to provide digital content to viewing devices, such as a television, computer monitor, and the like. Similarly, the Home KDC 104 is typically a single device (e.g., a STB, a DVR, etc.) in a home network that is designated to function as a media gateway. The Home KDC 104 facilitates communication between the local network 102 and the other components of the system 100. In addition, the Home KDC 104 exchanges messages with the devices $106_1 \ldots _N$ in order to register a client device, provide tickets needed to obtain content from a media server 122, and the like.

The local media server 122 comprises a device (e.g., DVR, PC, portable media player, multimedia phone, etc.) that directly provides digital content to the plurality of client devices $106_1 \ldots _N$. More specifically, the local media server 122 receives requests for content (which is initially provided by the main content provider 108 in an encrypted format)

from the client devices. The client device's selection is encoded in a Key Request message and is presented to the media server 122 (along with a ticket obtained from the Home KDC). The media server 122 also comprises a right management module (RMM) 140 (e.g., an IPRM component) that is responsible for determining if the client device is authorized to receive the requested content. The RMM 140 also requests the necessary decryption keys from the Home KDC 104. In one embodiment, the media server 122 and the Home KDC 104 may be the same device.

The remote device 120 may comprise a STB, DVR, or some other device that is similar in structure to a local client device 106. Notably, the remote device 120 is characterized as a device that is located outside of the local network 102. However, the remote device 120 may be a part of a "remote network" (not shown) whose arrangement is not unlike local network 102.

The main content provider 108 may comprise a streaming server that provides the digital content requested by the client devices $106_1 \ldots _N$. More specifically, the main content provider 108 distributes encrypted content to the local media server 122 positioned in the local network where the content is ultimately provided to the appropriate client device. In one embodiment, the content provider 108 may be configured to utilize caching servers (not shown) throughout the system 100 to distribute content to the local network(s).

The proximity control function is performed during the execution of key management message exchanges. Notably, these key management messages are employed to serve as proximity measurement messages. More specifically, the present invention is capable of determining if a requesting client device 106 is positioned in a local network 102 (e.g., near the Home KDC) every time the client device initiates a particular key management message exchange. For example, the present invention may utilize an Init Principal Request/Reply message exchange, an application server (AS) Request/Reply exchange, a Key Request/Reply exchange, and other like message exchanges as described in Table 1 of U.S. Patent Application No. 2003/0093694. The Init Principal Request/Reply exchange is a message exchange that takes place between a client device 106 and a Home KDC 104. This message exchange is initiated when the client device registers with the Home KDC. Namely, the client device 106 sends an Init Principal request message that includes a client signature and digital certificate. In response, the Home KDC 104 will ultimately reply with an Init Principal reply message that carries an acknowledgement message from the Home KDC 104 that includes the Home KDC certificate and digital signature. By implementing the proximity control mechanism in an Init Principal Request/Reply message exchange, the present invention can prevent a device from being able to register remotely.

In the case where a proximity control function is being sent in the middle of the Init Principal Req/Rep message exchange, the Init Principal Req/Rep messages may be authenticated with digital signatures and digital certificates of both parties (Home KDC and client device). In one embodiment, a proximity measurement message (e.g., a round-trip time (RTT) Measurement Req message) used during the registration transaction may also contain a digital signature and a digital certificate of the Home KDC 104. Similarly, the reply proximity measurement message (e.g., a RTT Measurement Rep) would contain a digital signature and digital certificate of the client device. Determining proximity at this point ensures that only local devices can be provisioned (or registered) to the secure home network domain, i.e., the client devices must be in proximity to the Home KDC at the time of registration. In one embodiment, both symmetric cryptographic and asymmetric cryptographic algorithms may be used to authenticate the proximity measurement messages.

The AS Request/Reply exchange is a message exchange that occurs between the client device 106 and the Home KDC 104 when the client device requests a ticket from the KDC 104. The ticket is an authentication token allowing the client device to obtain content from a particular content server (e.g., a DVR) positioned in the user's local network 102. More specifically, the client device 106 authenticates itself by digitally signing the AS Request message with its private key. The Home KDC 104 then issues a ticket to the client device 106 that may be used for authentication to that particular content server (e.g., a DVR). The ticket is delivered in a message that is digitally signed using the Home KDC's private key. By implementing the proximity control mechanism in the AS Request/Reply message exchange, the present invention can effectively conduct a proximity check every time a ticket is requested. In one embodiment, tickets are refreshed periodically (e.g. every 5 days). Determining proximity at this frequency ensures that only local client devices can refresh their tickets, which enables a local client device to access to the content stored in the home network, i.e., the client devices must be in proximity to the Home KDC at the time of ticket request. This prevents a user from initially registering a client device that is local to the Home KDC and then moving the client device to a remote location permanently.

The Key Request/Reply exchange is a message exchange that occurs between the local network's content server and a client device 106. This exchange is conducted in order to obtain rights and a decryption key to specific content. By implementing the proximity control mechanism in the Key Request/Reply message exchange, the present invention can perform a proximity check every time content is requested.

In the case where a proximity control function is being sent in the middle of a Key Req/Rep transaction, RTT Measurement Req/Rep messages may be authenticated using a Message Authentication Code (MAC) computed with a session key contained in the ticket of the receiving device. The Key Req message containing a ticket with the session key, so that the session key will be available to authenticate the new RTT Measurement Req/Rep messages.

The proximity control feature of the present invention may be incorporated into any of the aforementioned message exchanges. To illustrate, consider a client device 106 that initiates communication with the Home KDC 104 or media server 122 by transmitting a message request. The message request may be a registration request, an authorization request, or the like. Instead of immediately responding to and accommodating the client device's key management request, the Home KDC 104 (or media server 122) sends a measurement request (e.g., an RTT measurement request) back to the initiating client device 106. Generally, the device (e.g., the Home KDC or media server) that receives the request message is responsible for conducting the proximity request. Thus, if an INIT Principal Request, or an AS Request is received, the Home KDC responds and conducts the proximity test. Conversely, if a Key Request is received, the media server 122 conducts the proximity test.

The measurement request may comprise a proximity measurement message, or any like communications signal, that asks the client device 106 to respond with an acknowledgement (ACK) message (e.g., an RTT measurement reply). Upon receipt, the acknowledgement message from the client device 106 is processed by the Home KDC 104 in order to determine the general proximity of the client device 106 in relation to the Home KDC 104. In one embodiment, the Home KDC 104 measures the amount of time that expires between the time the Home KDC 104 transmits the measurement request (e.g., an RTT measurement request) and the time the Home KDC 104 receives a reply (e.g., an RTT measurement reply) from the client device 106. The Home KDC then compares the measurement parameter (i.e., the calculated RTT) to a predefined threshold. In one embodiment, the threshold may be a number designated by the manufacturer (e.g., 7 milliseconds) that may not be altered by the user. In an alternative embodiment, this threshold may be modified by the service provider in a secured manner (e.g., via the Home KDC 104) in order to accommodate certain network conditions. For example, if the user determines that the network is experiencing a high level of activity and traffic, the proximity parameter threshold may be increased to 10 milliseconds to compensate for the excessive conditions. If the measurement parameter exceeds the predetermined threshold, the transmitting client device is deemed to be outside of the local network.

In another embodiment, more advanced measurements such as a global positioning system (GPS) may be utilized. For example, the client device may respond to the measurement request message with its GPS location. The receiving server may then compare the device location with its own GPS location. The server may be configured to execute an algorithm to calculate its distance from the client device and subsequently compare the calculated distance with a configuration parameter that defines an acceptable distance.

In one embodiment, additional security measures may be taken to ensure the secure transfer of content. Namely, the utilization of a nonce (random number) that binds each pair of messages may be implemented to prevent replay attacks. For example, an Init Principal Req that contains a random client nonce should be repeated in the RTT Measurement Req message. More specifically, the client device receiving an RTT Measurement Req has to check that the client nonce value in this message is the same as what the client generated and included in the Init Principal Req message. If the client nonce does not match, then this may indicate the intentional replay of some earlier message. Consequently, the client device should drop the message and ignore it.

Similarly, the Home KDC 104 may include a KDC nonce value in the RTT Measurement Req message which should be identical to a KDC nonce in the RTT Measurement Rep sent back by the client device. If the Home KDC 104 receives an RTT Measurement Rep that includes a different KDC nonce value, it could mean that it was an intentional replay of an earlier message (e.g., to create denial of service) and is also dropped. If the RTT measurement Req/Rep messages have to be retried because the RTT delay was too long, the entire transaction is repeated (e.g., the key management request is retransmitted). When the Home KDC 104 finally accepts RTT Measurement Rep (because the RTT value is measured to be sufficiently small), then the Init Principal Rep message response it will include a client nonce value that is identical to the nonce that the KDC 104 received in the last RTT Measurement Rep message.

Figure 2:
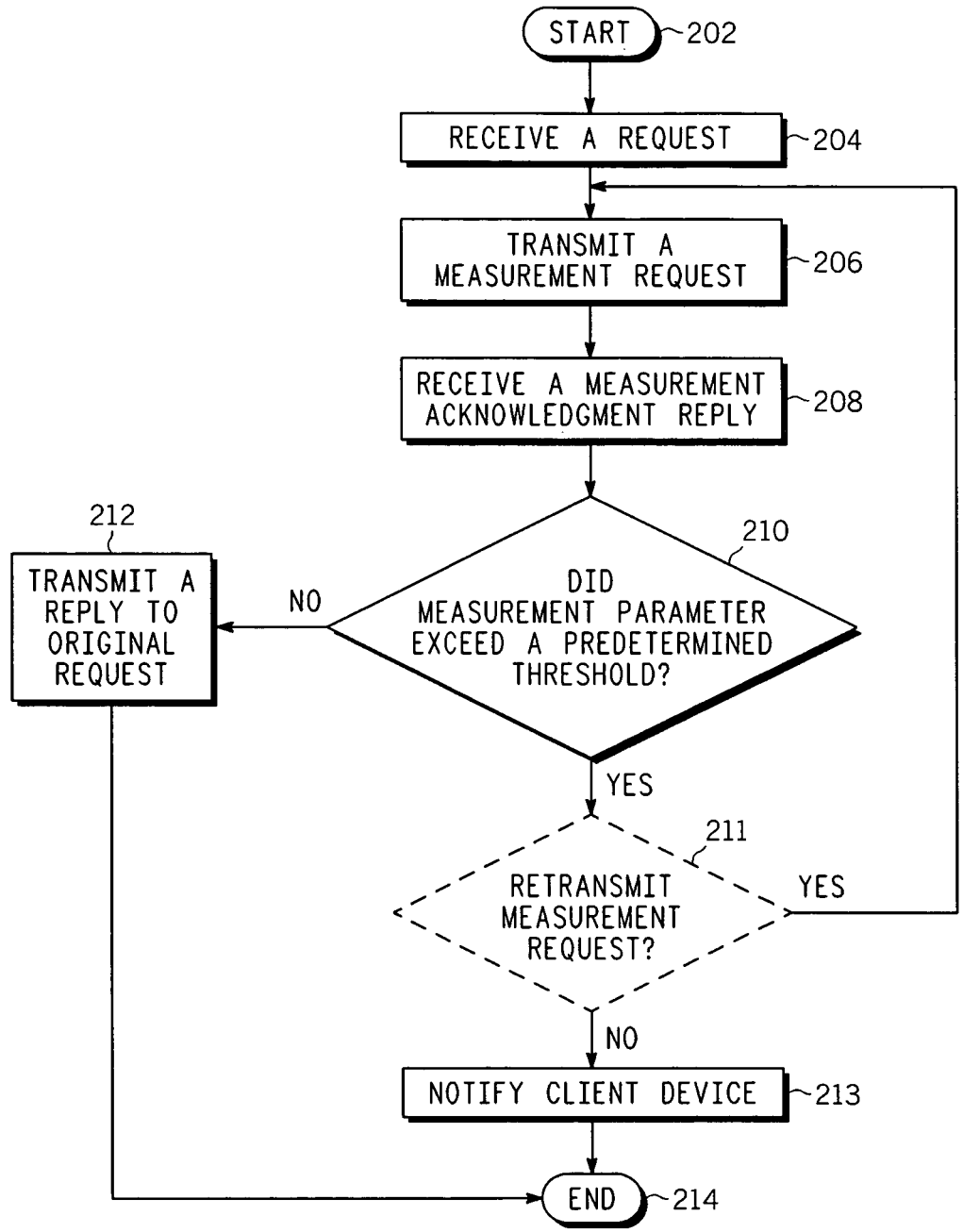
FIG. 2 depicts a method for determining the proximity of a client device in accordance with the present invention.

FIG. 2 illustrates a method 200 for determining the proximity of a client device to a Home KDC (or media server) that is positioned in a local network in accordance with the present invention. Method 200 begins at step 202 and proceeds to step 204 where a key management request is received. In one embodiment, the Home KDC 104 receives a request from one of the client devices $106_{1...N}$. The key management request may comprise a registration request, an authorization request, a key request, or the like.

At step 206, a measurement request is transmitted. In one embodiment, the Home KDC 104 may be configured to perform proximity checks. Consequently, the Home KDC 104 is programmed to transmit a measurement request message (e.g., an RTT measurement request) in response to the client device's initial request before providing the requested data. Upon sending the measurement request, the Home KDC 104 records the time (e.g., time stamps) of the transmission.

At step 208, a measurement reply message is received. In one embodiment, the Home KDC 104 receives a measurement acknowledgement reply (e.g., an RTT Measurement reply) from the responding client device. More specifically, the client device responds by transmitting a message acknowledging the receipt of the measurement request immediately after receiving the RTT measurement request. Notably, the Home KDC 104 records the time the measurement reply message is received from the client device.

At step 210, a determination of whether the measurement parameter (e.g., calculated RTT) exceeds a predetermined threshold is made. In one embodiment, the Home KDC 104 calculates the amount of time that expires from the instant the measurement request is transmitted to the client device to the time the measurement acknowledgement reply is received. For example, if the RTT is found to be greater than a predefined threshold of 7 milliseconds, the Home KDC 104 will not be able to confirm that the client device is local to the Home KDC 104.

If the predetermined threshold is not exceeded, the method 200 proceeds to step 212 where a reply to the original request is transmitted. In one embodiment, the Home KDC 106 determines that the client device is located in the local network 102 and sends the appropriate reply to the client device's initial key management request (e.g., a registration reply to a registration request). The method 200 ends at step 214.

If the predetermined threshold is exceeded, the method 200 then proceeds to step 211, where a determination of whether to retransmit a measurement request is made. If a predetermined threshold (e.g., an acceptable number of "retries") is not exceeded, then the method 200 will loop back to step 206 where the Home KDC 104 transmits another measurement request. The retransmission of the measurement request may be necessary in case excessive network traffic has delayed the communication between the Home KDC 104 and the client device, thus causing the calculated RTT to exceed the threshold. An RTT in excess of 7 milliseconds (or any predefined threshold level) may indicate that the client device is not in the local network and is instead positioned in a remote location (e.g., remote device 120). In an alternative embodiment, step 211 may be omitted from method 200. Notably, the client device resubmits the original key management request upon the failure of the transaction.

If at step 211 it is determined that the retransmission of the measurement request should not occur (e.g., the RTT continues to exceed the threshold after a predefined number of "rechecks"), then the method 200 continues to step 213. At step 213, the client device will be notified that its initial request cannot be met. The method 200 then ends at step 214.

In another embodiment, a request from a remote device positioned outside the local network may not be rejected. Specifically, a remote client device may be permitted to register with the Home KDC regardless of the client device's location. In this scenario, the proximity control would only be performed during a Key Req/Key Rep exchange. Although a remote device may be permitted to register, it may be prevented from acquiring certain digital rights to requested digital content except on a limited basis (e.g., the device may be able to receive digital content, but is unable to move or copy the digital content). Alternatively, the media server may be configured to inspect the digital rights to determine if a proximity check for a particular Key Request should be performed.

Figure 3:
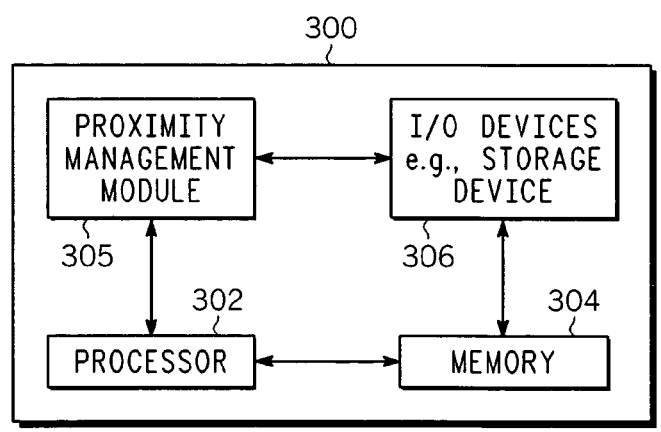
FIG. 3 is a block diagram depicting an exemplary embodiment of a computer suitable for implementing the processes and methods described herein.

FIG. 3 depicts a high level block diagram of a Home KDC 104, media server 122 or general purpose computer suitable for use in performing the functions described herein. As depicted in FIG. 3, the system 300 comprises a processor element 302 (e.g., a CPU), a memory 304, e.g., random access memory (RAM) and/or read only memory (ROM) and/or persistent memory (Flash), an proximity management module 305, and various input/output devices 306 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, the proximity management module or process 305 can be loaded into memory 304 and executed by processor 302 to implement the functions as discussed above. As such, the present proximity management module 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for determining proximity of a client device, comprising:
    acquiring a plurality of key management requests from said client device, wherein each of the plurality of key management requests includes a request to obtain a decryption key specific to a digital content to allow said client device to access the digital content from a content server;
    transmitting a measurement request to said client device in response to acquiring each said key management request;
    receiving a measurement reply from said client device in response to each measurement request;
    determining if a measurement parameter associated with said transmitting and said receiving exceeds a predetermined threshold; and
    transmitting a response to each said key management request to said client device when said predetermined threshold is not exceeded, wherein the response includes the decryption key specific to the digital content that allows said client device to access digital content from said content server.

2. The method of claim 1, wherein said measurement parameter comprises a round trip transmittal time associated with said transmitting and said receiving.

3. The method of claim 2, wherein said response comprises at least one of: an Init Principal reply message, a Key reply message, or an application server (AS) reply message.

4. The method of claim 1, wherein said measurement parameter comprises a global positioning system (GPS) location.

5. The method of claim 1, wherein said key management request comprises at least one of: an Init Principal request message, a Key request message, or an application server (AS) request message.

6. The method of claim 1, wherein a nonce binds said key management request and said measurement request to prevent a replay attack.

7. The method of claim 1, wherein a nonce binds said measurement request and said measurement reply to prevent a replay attack.

8. The method of claim 1, wherein proximity measurement messages are authenticated using at least one of: symmetric cryptography or asymmetric cryptography.

9. An apparatus for determining proximity of a client device, comprising:
    means for acquiring a plurality of key management requests from said client device, wherein each of the plurality of key management requests includes a request to obtain a decryption key specific to a digital content to allow said client device to access the digital content from a content server;
    means for transmitting a measurement request to said client device in response to acquiring each said key management request;
    means for receiving a measurement reply from said client device in response to each measurement request;
    means for determining if a measurement parameter associated with said transmitting and said receiving exceeds a predetermined threshold; and
    means for transmitting a response to each said key management request to said client device when said predetermined threshold is not exceeded, wherein the response includes the decryption key specific to the digital content that allows said client device to access digital content from said content server.

10. The apparatus of claim 9, wherein said measurement parameter comprises a round trip transmittal time.

11. The apparatus of claim 10, wherein said response comprises at least one of: an Init Principal reply message, a Key reply message, or an application server (AS) reply message.

12. The apparatus of claim 9, wherein said measurement parameter comprises a global positioning system (GPS) location.

13. The apparatus of claim 9, wherein said key management request comprises at least one of: an Init Principal request message, a Key request message, or an application server (AS) request message.

14. The apparatus of claim 9, wherein a nonce binds said key management request and said measurement request to prevent a replay attack.

15. The method of claim 1, wherein a nonce binds said measurement request and said measurement reply to prevent a replay attack.

16. A non-transitory computer readable medium having stored thereon instructions that, when executed by a processor, causes the processor to perform a method for determining proximity of a device, comprising:
    acquiring a plurality of key management requests from said client device, wherein each of the plurality of key management requests includes a request to obtain a decryption key specific to a digital content to allow said client device to access the digital content from a content server;

transmitting a measurement request to said client device in response to acquiring each said key management request;

receiving a measurement reply from said client device in response to each measurement request;

determining if a measurement parameter associated with said transmitting and said receiving exceeds a predetermined threshold; and transmitting a response to each said key management request to said client device when said predetermined threshold is not exceeded, wherein the response includes the decryption key specific to the digital content that allows said client device to access digital content from said content server.

17. The computer readable medium of claim 16, wherein said measurement parameter comprises a round trip transmittal time associated with said transmitting and said receiving.

18. The computer readable medium of claim 17, wherein said response comprises at least one of: an Init Principal reply message, a Key reply message, or an application server (AS) reply message.

19. The computer readable medium of claim 16, wherein said measurement parameter comprises a global positioning system (GPS) location.

20. The computer readable medium of claim 16, wherein said key management request comprises at least one of: an Init Principal message, a Key request message, or an application server (AS) request message.

* * * * *